(12) United States Patent
Wakayama (10) Patent No.: US 9,217,791 B1
(45) Date of Patent: Dec. 22, 2015

(54) PING CONTROL OPTIMIZATION METHOD FOR MULTI-STATIC ACTIVE ACOUSTIC NETWORKS

(71) Applicant: The United States of America as represented by the Secretary of the Navy, Washington, DC (US)

(72) Inventor: Cherry Y. Wakayama, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 445 days.

(21) Appl. No.: 13/874,136

(22) Filed: Apr. 30, 2013

Related U.S. Application Data (63) Continuation-in-part of application No. 13/155,231, filed on Jun. 7, 2011.

(51) Int. Cl.
*G01S 15/00* (2006.01)
*G01S 15/02* (2006.01)
*G01S 15/66* (2006.01)

(52) U.S. Cl.
CPC ........ *G01S 15/02* (2013.01); *G01S 15/66* (2013.01)

(58) Field of Classification Search
CPC .................................. G01S 15/02; G01S 15/66
USPC ........................................................ 367/87
See application file for complete search history.

(56) References Cited

PUBLICATIONS

D. W. Krout, M. A. El-Sharkawi, W. J. L. Fox, and M. U. Hazen, Intelligent Ping Sequencing for Multistatic Sonar Systems, Proc. of the 9th Intl. Conf. on Information Fusion, Florence, Italy, Jul. 2006.
A. Saksena, and I-J. Wang, Dynamic Ping Optimization for Surveillance in Multistatic Sonar Buoy Networks with Energy Constraints, Proc. of the 47th IEEE Conf. on Decision and Control, Cancun, Mexico, Dec. 2008.
D.W. Krout, A. El-Sharkawi, W. J. L. Fox, "Probability of Target Presence for Multistatic Sonear Ping Sequencing," Journal of Oceanic Engineering, vol. 34, No. 4, pp. 603-609, Oct. 2009.
(Continued)

*Primary Examiner* — Luke Ratcliffe
*Assistant Examiner* — Hovhannes Baghdasaryan
(74) *Attorney, Agent, or Firm* — SPAWAR Systems Center Pacific; Kyle Eppele; Ryan J. Friedl (57) ABSTRACT

A method includes, until the end of an operational scenario time window, iteratively repeating the steps of selecting a ping optimization method based upon a mission mode, remaining scenario time, total remaining ping energy, and an acoustic performance metric, generating a set of acoustic pings using an acoustic ping source network including more than one acoustic ping sources selected according to the ping optimization method, processing detections from the generated set of acoustic pings, and updating performance metric predictions associated with optimization decision variables for the operational scenario time window. The method may provide intelligent ping control decisions for multi-static active acoustic networks.

20 Claims, 5 Drawing Sheets

(56) References Cited

PUBLICATIONS

C. Y. Wakayama, D. J. Grimmett, and Z. B. Zabinsky, "Forecasting Probability of Target Presence for Ping Control in Multistatic Sonar Networks using Detection and Tracking Models," Proc. of the 14th Intl. Conf. on Information Fusion, Chicago, US, Jul. 2011.

C. Y. Wakayama, and D. J. Grimmett, "Adaptive Ping Control for Track-Holding in Multistatic Active Sonar Networks," Proc. of the 13th Intl. Conf. on Information Fusion, Edinburgh, UK, Jul. 2010.

PING CONTROL OPTIMIZATION METHOD FOR MULTI-STATIC ACTIVE ACOUSTIC NETWORKS

CROSS-REFERENCE TO RELATED APPLICATIONS

This application is a continuation-in-part of commonly-assigned U.S. patent application Ser. No. 13/155,231 filed Jun. 7, 2011, entitled "Adaptive Ping Control Method for Track-Holding in Multi-Static Active Sonar Networks", the entire content of which is fully incorporated by reference herein.

FEDERALLY-SPONSORED RESEARCH AND DEVELOPMENT

The Ping Control Optimization Method for Multi-Static Active Acoustic Networks is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 102247.

BACKGROUND

Distributed multi-static active acoustic networks are useful for detecting various underwater objects (targets). Such networks provide the capability to detect, localize, and track targets through the expanded geometric diversity of a distributed field of sources and receivers. However, given the variabilities in acoustic environmental conditions, sensor performance and target behavior, such networks cannot exploit their full potential without management and control methods. Accordingly, it is desirable to provide a control optimization method that may be applied to the ping scheduling task of a multi-static active acoustic network to obtain improved detection, localization and tracking performance.

DETAILED DESCRIPTION OF SOME EMBODIMENTS

The proper implementation of a ping control method within a multi-static network will depend on the current mission "mode of operation". In the "Target Search" mode of operation, the objective is to quickly detect any targets present within the surveillance area and initiate tracking using these detections. If detections are not obtained (when performance predictions indicate targets should be detectable), there is more confidence that the area is effectively cleared. In the "Track-Holding" mode of operation, the objective is to maintain high-quality track estimates for those targets that have already been detected. In the "Search and Hold" mode of operation, the objective is to perform the previous two modes in parallel: maintain tracking on detected targets while continuing to search for undetected targets. It may be that even within the operational scenario, the mission mode may change from one to another. This paper describes a dynamic ping control decision methodology that is applicable over this wide range of mission modes and operational scenarios, while also considering energy constraints of the system's acoustic sources.

Ping control algorithms require a metric for the predicted sonar performance obtained by pinging a given source at a particular time. A number of performance metrics may be selected for this purpose. Among them are: average detection probability during search mode with confirmed detections, probability of target presence during search mode without confirmed detections, probability of target presence during search and/or track-hold mode with confirmed detections, and a residual risk metric for area clearance. Predictions are of most value to the control process within a near future time window. A near future time window may be described as the time window within which the prediction of target state using a nearly constant velocity motion model is valid.

Given the prohibitive task of accurately and efficiently forecasting sonar performance metrics for a far future time window, it is assumed that the probability of target presence is uniform over the search area and therefore a constant, nominal sonar performance metric for each source as given by a sonar performance method is used. Although the accuracy of predicted performance metrics is important, the focus is on obtaining the ping decision assuming appropriate sonar performance metrics are given.

A greedy approach to ping control may used to select a ping source which optimizes one-step prediction of the expected detection performance metric during both search and track-hold modes. Another greedy approach may involve the selection of not only a ping source, but also a waveform type and fine tuned ping timing adjustments to obtain high-strength specular echoes. It may also optimize the one-step prediction of the detection performance metric, but only for the track-hold mode. However, the greedy approaches using a one-step performance metric prediction do not consider the remaining ping energy at each source. This may result in over-usage of certain sources (risking too early expenditure to complete the mission) or ping waste (pinging when no/little benefit is expected).

Another ping control method involves an approximate dynamic programming approach with sampling based policy rollout implementation is used to address the energy constraint at sources (during search mode) with the goal of extending network lifetime. The approach is to obtain an optimized ping sequence solution (including quiescent periods, as needed) over the entire scenario time horizon. Such an approach may extend the network lifetime but optimizing based only on the detection performance metric may result in early expiration of certain sources. Further, policy rollout implementation to generate performance metric predictions over a long time horizon is computationally expensive and the suitable prediction accuracy for future performance metrics is hard to achieve due to unknown target behaviors.

As described herein, a methodology is provided to address the wide spectrum of operational modes previously mentioned. Each of these will depend on the remaining time in the operational scenario and the remaining ping energy at each source. It is assumed that a capability exists to estimate performance metrics for each source within the near-future time frame and a constant, nominal performance metric is used for each source within the far-future time frame. The optimization methodology will consider the following multiple objectives: maximizing the performance metric, balancing ping source usage, and maintaining a certain level of ping activity.

In previous work on ping control optimization, it has been assumed that ping optimization can be encompassed within a single overriding objective, such as maximizing detection probability. However, this assumption is not realistic, especially in certain applications where forecasting detection performance metrics over the scenario time horizon may be prohibitive. Ping control optimization should also focus on other operational objectives, such as maintaining area coverage capability over the scenario time horizon, extending network lifetime, preventing long ping gaps in addition to maximizing the detection metric. The goal programming approach provides a way of striving toward multiple objectives simultaneously. The embodiments of the method disclosed herein correspond to different operational modes and energy supply levels.

The ping control methodology can be summarized as follows: given the scenario (mission mode, remaining scenario time, and remaining energy) and the assumed performance metrics, a user or automated rule-set determines which ping optimization method is to be solved. A solution is then provided for the ping source sequence for discretized ping times over the remaining scenario time. The first k (less than or equal to the scenario time window) ping sources are selected and pings are generated accordingly. Detections from the k pings are processed by a multi-static target tracker and the performance metric predictions for the remaining time window are then updated.

At this point the optimization procedure iterates. An optimization method is then selected based on the updated scenario and solved to generate a new ping sequence. This process is repeated until the end of the operational scenario time window. The faster the performance metric update rate (i.e. smaller k), the more accurate the performance metric predictions can be made, and thus a more effective and efficient ping solution can be achieved.

Figure 1:
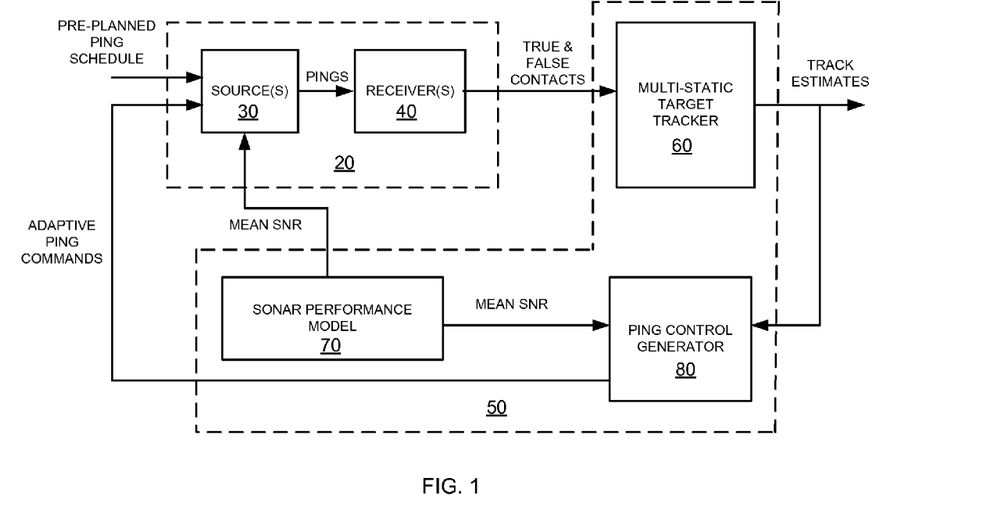
FIG. 1 shows a diagram of an embodiment of a system architecture that may be used to implement methods in accordance with the Ping Control Optimization Method for Multi-Static Active Acoustic Networks.

FIG. 1 shows diagram of an adaptive ping control system architecture 10 that may be used to implement the Ping Control Optimization Method for Multi-Static Active Acoustic Networks. Architecture 10 includes a multi-static active acoustic network 20 and a processor 50 operatively connected thereto such as via wired or wireless connection. Processor 50 may be a general purpose computing device having several modules stored therein, such as a multi-static target tracker module 60, a sonar performance method (SPM) module 70, and a ping control generator module 80.

As used herein, the term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Such modules may be utilized separately and/or together locally and/or remotely to form a program product thereof, that may be implemented through non-transitory machine recordable media.

The adaptive ping control system architecture is based on principles of feedback control of dynamical systems with uncertainty parameters. In this architecture, the target information is obtained by sensor measurements and processed by the tracker and the control generator, and the processed information is then fed back to the sensor network for improved tracking.

Network 20 generates contacts which represent true (target-originated) and false echo detections (false alarms) at each receiver 40 for each processed acoustic ping, the ping being generated by ping source 30. Multi-static target tracker 60 computes current and future state estimates based on sensor data, target motion model and measurement uncertainties and produces tracks. Sonar performance method 70 computes mean signal-to-noise ratios (SNR) for given field configurations, consisting of sources, receivers and targets. Ping control generator 80 generates ping commands as a function of the predictions (future state estimates) of multi-static target tracker 60, control parameters, and predictions from sonar performance method 70.

Network 20 may include one or more sources 30 for generating pings and one or more receivers 40 for receiving detections from the generated pings. In some embodiments, each ping source 30 is powered by a power source, such as a battery, while in other embodiments one power source powers all of the ping sources 30. In some embodiments, power from one ping source 30 may be used to activate a different ping source 30. Further, as network 20 may be remotely deployed, each of ping sources 30 may have a limited amount of ping energy determined by the available power from their respective power source. After a ping source 30 has generated one or more pings, ping source 30 will have a limited amount of ping energy remaining for use in generating subsequent pings.

In some embodiments, sources 30 and receivers 40 may be operatively connected via a wired or wireless connection. As an example, sources 30 may comprise of one or more active source sonobuoys and receivers 40 may comprise of one or more passive receiver sonobuoys. Network 20 provides contact (scan) files for each receiver 40, given a waveform transmission from a particular acoustic source 30 at a particular ping time. The contacts consist of both target-originated contacts and false alarm contacts. The resulting scan files may be input into multi-static target tracker 60. As an example, network 20 may be driven by an adaptive ping control algorithm, such as that described by Wakayama et al, "Adaptive Ping Control for Track-Holding in Multi-Static Active Sonar Networks", Proc. Of the 13$^{th}$ Intl. Conf on Information Fusion, Edinburgh, UK, July 2010, or by a pre-planned ping schedule (which may be done to provide a comparison baseline).

Each contact may contain the following information: source and receiver identification, waveform type, ping time, SNR, bearing, arrival time (for ranging), and range-rate (if Doppler-sensitive continuous waveform is used). In a simulation framework, target contacts are derived from a manufactured scenario of target truth trajectories. The target contacts are modeled by obtaining a mean SNR from sonar performance method 70, and adding a random fluctuation term drawn from a Gaussian distribution (nominally 0 mean and 5 dB standard deviation), along with assumed measurement (bearing, time, and range-rate) errors. A number of false alarm contacts (nominally 50) are generated for each sonar scan, with a uniform distribution in time-bearing measurement space, and a Gaussian distribution for bi-static range-rate. As an example, a false contact SNR may be modeled assuming a Gaussian distribution (nominally 12 dB mean and 5 dB standard deviation).

Multi-static target tracker 60 associates measurement contacts to existing tracks and generates track state estimates. Tracker 60 may comprise, for example, a centralized, Kalman Filter tracker. The input to tracker 60 is a series of contact files (measurement scans), unique to each source-receiver-waveform and time of ping transmission provided by network 20. Target motion is modeled using a 2-dimensional nearly constant velocity motion method. Converted, de-biased positional measurements may be used together with range-rate measurements in an extended Kalman Filter (EKF). A logic-based track initiation (M/N) and termination (K) scheme may also be used. Further, nearest neighbor data association may be used, with a 2-dimensional or 3-dimensional (if Doppler measurements are available) ellipsoidal association gate. Track state estimates at the next potential ping transmission times for the track-set selected for holding are provided to ping control generator 80. Those tracks may be selected according to classification track scores which may be based on kinematic correlations, track lengths, prior information, etc. Alternative tracking approaches, the Probability Hypothesis Density (PHD) filter, may be implemented as Tracker 60.

Sonar performance method 70 provides mean levels of SNR, which are used by ping control generator 80. Accurate modeling of sonar system performance is non-trivial, given the complexity and uncertain knowledge of the underwater acoustic environment. As an example, a bi-static sonar performance method may be used. In other embodiments, higher fidelity acoustic sub-methods may be incorporated into the approach, as needed. A wholly reverberation limited shallow water environment is assumed, being dominated by sea bottom reflections.

Transmission losses to/from the target and the bottom underneath it are assumed equivalent. CW (Continuous Waveform) and FM (Frequency Modulated) waveforms are modeled using their respective Q-functions (descriptions of their performance against reverberation). Aspect-dependent target strength is modeled, and includes high-strength echoes when the target is in the specular condition. The specular geometric condition occurs when the angles from the target to the source and receiver are equal (fore and aft, or, aft and fore) from the target's beam angle (+/−90 degrees from the target's heading). Levels of mean SNR for a single ping received by the entire field are output, given bi-static source-receiver geometries, assumed target speeds and headings, and other parameters.

In some embodiments, ping control generator 80 uses future state estimates of the tracks for holding from multi-static target tracker 60, mean SNRs from sonar performance method 70, and control objectives, to derive an optimal ping command that includes source, waveform, and ping time selection. In some embodiments, only the track-holding scenario is considered, where confirmed tracks have already been established and the tracks for holding have been identified by multi-static target tracker 60. An objective of ping control generator 80 is to maximize the average instantaneous detection probability of the tracks at the input and output of target tracker 60 for effective holding of the targets. The strategy is to focus on regions of the state space with higher likelihood of future target presence and maximize the target detection probability by intelligent ping management.

Four optimization sub-methods have been developed to be used within the framework. The baseline method (P1) is activated for tracking particular target(s) over a relatively short time window, with the overriding objective of maximizing performance to maintain continuous track-hold on targets already detected. The short time window may be defined by short ping schedule length and a quick ping rate. For example, a short time window may involve a ping schedule length of 3-4 pings and a ping rate of 1-3 minutes between pings, indicating a total time window range of 3-12 minutes. As an example, a short time window may be less than 60 minutes. Remaining energy at sources is ignored in the optimization objective in this case. The other methods, (P2), (P3), and (P4), may be activated for target search and/or search-hold modes.

The energy reservation method (P2) is activated when the ping energy is limited at certain sources but enough total ping energy is available to cover the scenario time window. The optimization objectives for (P2) are maximizing the performance metric over the scenario time window and preventing the over usage of the sources with limited energy. This prevents premature expiration of those sources, thereby maintaining area coverage over the scenario time window. To include the latter objective, the total scenario window is divided into subintervals and allocates ping energy from each source to each subinterval. A penalty is applied when there is over usage of ping energy by sources that have limited energy. The allocation of a source's remaining ping energy is distributed approximately uniformly over the subintervals.

The ping activity method (P3) is activated when the total ping energy is very limited with respect to planned scenario time window. An example of this is the case of equipment failure, and the additional optimization objective is to extend the network lifetime while maintaining a certain minimum ping activity level (i.e., no long ping gaps) until all ping energy is exhausted. To prevent long gaps between successive pings, an m-of-n ping activity rule is used, which is to generate at least m pings over the n discretized ping times. The penalty for violating the m-of-n rule is then included in the total objective function of (P3).

The complete method (P4) may be activated when the ping energy is limited at certain sources as in (P2), or when there is not enough total ping energy for the planned operating time window as in (P3). Here, the goal is to strategically distribute null pings over the time window to last the duration of the scenario, without significantly sacrificing detection performance. In this method, both the energy reservation objective of (P2) and the ping activity objective of (P3) are included, in addition to the sonar performance objective.

Mathematical descriptions are provided below for four integer-linear goal programming methods, which incorporate the additional operational goals described above. The notation used is as follows:

Index sets and parameters:

$N_S$=number of acoustic ping sources, $J=\{1, 2, \ldots, N_S\}$,

T=number of discretized ping times in the remaining scenario window, $P=\{1, 2, \ldots, T\}$, $N_\Delta$=number of subintervals in the remaining scenario window, $Q=\{1, 2, \ldots, N_\Delta\}$, $\Delta_q$=set of consecutive ping times in P in subinterval q, q∈Q, $e^j$=remaining number of pings at source j, j∈J, $\Delta e_q^j$=allocated number ping energy for source j in subinterval q, j∈J, q∈Q, m=lower bound of number of pings in m-of-n ping activity rule, n=number of consecutive ping times in m-of-n ping activity rule, $N_\delta$=number of running time intervals over the remaining scenario time window, $R=\{1, 2, \ldots, N_\delta\}$, $\delta_r$=set of consecutive ping times in P in running time interval r, r∈R.

Performance parameters:

$c_p^j$=performance metric of source j at ping time p, j∈J, p∈P, $a_q^j$=penalty coefficient for over utilization of source j in subinterval q, j∈J, q∈Q, $b_r$=penalty coefficient for under pinging in running time interval r, r∈R.

Decision variables:

$x_p^j$=binary ping decision variable for j at ping time p, j∈J, p∈P, $x_p^j$ is 1 if allocated, 0 otherwise, $y_q^j$=over utilization integer decision variable for source j in subinterval q, j∈J, q∈Q, $z_r$=under pinging integer decision variable in running time interval r, r∈R.

Figure 2:
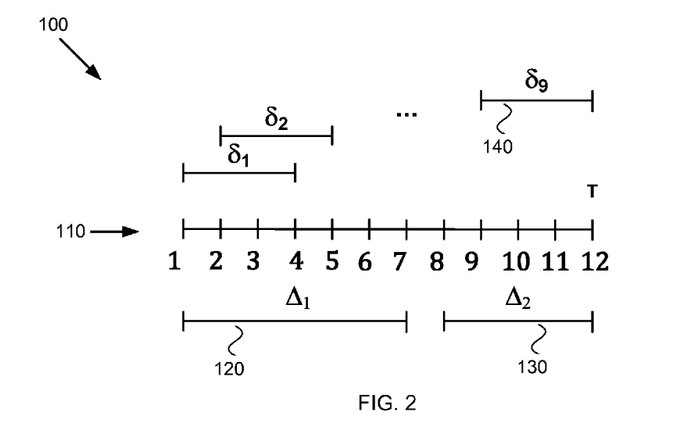
FIG. 2 shows a diagram illustrating the discretization of a remaining scenario time window in accordance with the Ping Control Optimization Method for Multi-Static Active Acoustic Networks.

The notation of time intervals is shown by a small example illustrated in FIG. 2. FIG. 2 shows a diagram 100 of an operational scenario time window 110 that is discretized into 12 ping times (T=12). Window 110 is divided into two subintervals ($N_\Delta$=2), with $\Delta_1$ 120 consisting of ping times {1, 2, ..., 7} and $\Delta_2$ 130 of ping times {8, 9, ..., 12}. Running time intervals 140 are chosen of length 4 (n=4; $N_\delta$=T−n+1=9), with $\delta_r$ consisting of ping times {r, r+1, r+2, r+3} for r=1, 2, ..., $N_\delta$.

The complete problem formulation (P4) is given by:

$$\max \sum_{p \in P} \sum_{j \in J} c_p^j x_p^j - \sum_{q \in Q} \sum_{j \in J} a_q^j y_q^j - \sum_{r \in R} b_r z_r \quad \text{(Eq. 1)}$$

$$\text{sub. to} \sum_{p \in P} x_p^j \leq e^j, \text{ for all } j \in J, \quad \text{(Eq. 2)}$$

$$\sum_{j \in J} x_p^j \leq 1, \text{ for all } p \in P, \quad \text{(Eq. 3)}$$

$$\sum_{p \in \Delta_q} x_p^j - y_q^j \leq \Delta e_q^j, \text{ for all } j \in J, q \in Q, \quad \text{(Eq. 4)}$$

$$\sum_{p \in \delta} \sum_{j \in J} x_p^j + z_r \geq m, \text{ for all } r \in R, \quad \text{(Eq. 5)}$$

$x_p^j$ is binary, for all j∈J, p∈P, (Eq. 6)

$y_q^j$ is a non-negative integer, for all j∈J, q∈Q, (Eq. 7)

$z_r$ is a non-negative integer, for all r∈R. (Eq. 8)

The objective function (1) includes the total sonar performance metric summing responses over all ping sources and all ping times in the scenario time window; the total penalty metrics summing over-utilization of the allotted pings over all sources and all subintervals; and the total penalty metrics summing under-pinging according to the m-of-n activity rule over all running intervals. The set of constraints include: Constraint (2)—for each source, total ping usage over the scenario window must not exceed available energy; Constraint (3)—at each ping time, at most one source is selected; Constraint (4)—for each source and for each subinterval, the number of allocated pings over the available pings is accounted for, so that each unit of over-usage can be penalized in the objective function; Constraint (5)—for each running time interval, the number of allocated pings below a desired number of pings is accounted for, so that each unit of under-usage can be penalized in the objective function; Constraints (6)-(8)—decision variables must be integers.

The four optimization methods correspond to four subproblems of the complete problem; the inclusion of certain terms in the objective and constraint functions depends on the mission mode and the remaining pings as described above. The four sub-methods are: baseline method (P1)—the objective function includes the first term of (1), and the constraint functions are given by (2), (3), and (6); energy reservation method (P2)—the objective function includes the first two terms of (1), and the constraint functions are given by (2), (3), (4), (6) and (7); ping activity method (P3)—the objective function includes the first and last terms of (1), and the constraint functions are given by (2), (3), (5), (6) and (8); complete method (P4)—it is equivalent to the complete problem (1)-(8). The optimization problems given above include the constraints that each decision variable ($x_p^j$, $y_q^j$, $z_r$) must be an integer.

A linear programming relaxation is applied to these problems where the integrality constraints are dropped. The resulting linear programs can be solved efficiently by the simplex method or other polynomial complexity methods. Below it is shown that optimal solutions to the relaxed problems are integer solutions, and therefore are also optimal solutions to the corresponding integer-constrained problems.

Each of the four integer-linear methods described herein can be solved as a relaxed linear method and the relaxed method satisfies the integer solution property. The following well-known result from Operations Research theory is applied, providing the conditions for integer solutions even if integer constraints are relaxed. Using the Hoffman-Kruskal Theorem, let A be an m by n integral matrix. Then the polyhedron defined by Ax≤b, x≥0 is integral for every integral vector b∈R$^m$ if and only if A is totally unimodular. A matrix is defined as "totally unimodular" if all of its square sub-matrices have determinant 0, 1, or −1. Three specially structured matrices with the totally unimodular (TU) property are of interest. These special matrices include: 1) a node-edge incidence matrix of a bipartite undirected network; 2) a node-edge incidence matrix of a directed network; and 3) a binary matrix with consecutive-ones property, i.e., in each row the 1's appear consecutively (also referred to as an interval matrix).

Baseline Method (P1)

(P1) is a linear optimization method with constraints (2) and (3). For ease of presentation, the following example with 2 ping sources ($N_S$=2) and 5 ping times (T=5) is considered. The corresponding constraint matrix, $A_1$, of the equivalent linear method is given as:

$$A_1 = \begin{bmatrix} A \\ B \end{bmatrix},$$

where $$A = \begin{bmatrix} 1 & 0 & 1 & 0 & 1 & 0 & 1 & 0 & 1 & 0 \\ 0 & 1 & 0 & 1 & 0 & 1 & 0 & 1 & 0 & 1 \end{bmatrix},$$

$$B = \begin{bmatrix} 1 & 1 & 0 & 0 & 0 & 0 & 0 & 0 & 0 & 0 \\ 0 & 0 & 1 & 1 & 0 & 0 & 0 & 0 & 0 & 0 \\ 0 & 0 & 0 & 0 & 1 & 1 & 0 & 0 & 0 & 0 \\ 0 & 0 & 0 & 0 & 0 & 0 & 1 & 1 & 0 & 0 \\ 0 & 0 & 0 & 0 & 0 & 0 & 0 & 0 & 1 & 1 \end{bmatrix}.$$

Figure 3:
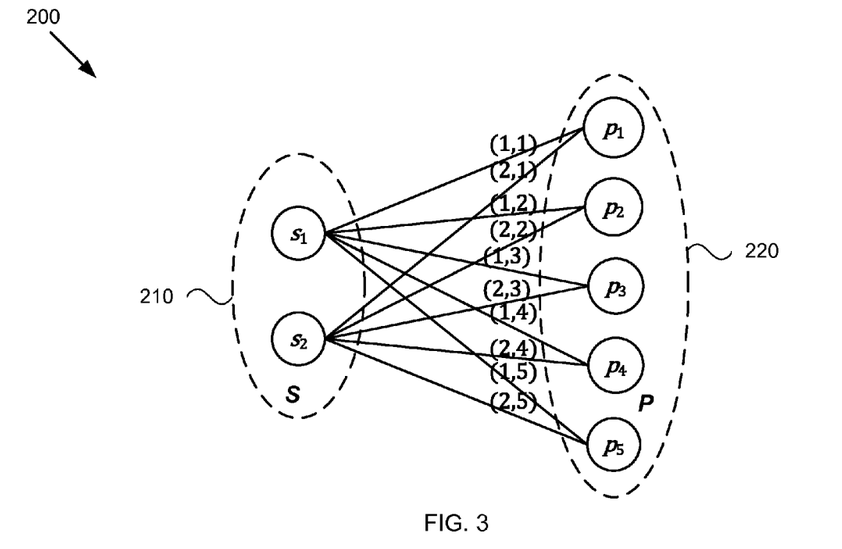
FIG. 3 shows a diagram illustrating a bipartite network representing the constraint matrix $A_1$ for an example with two sources and five ping times, in accordance with the Ping Control Optimization Method for Multi-Static Active Acoustic Networks.

In general, A and B have the dimensions of $N_S \times (N_S \times T)$ and $T \times (N_S \times T)$ respectively. Note that $A_1$ represents a node-edge incidence matrix of a bipartite undirected network and thus $A_1$ is totally unimodular. FIG. 3 shows a such a bipartite network 200 representing the constraint matrix $A_1$ for an example with two ping sources 210 $\{s_1, s_2\}$ and five ping times 220 $\{p_1, p_2, p_3, p_4, p_5,\}$. Edge (i,j) represents an edge incident to nodes $s_i$ and $p_j$. In FIG. 3, an edge (s, p) corresponds to a column in $A_1$ which has exactly two 1s; one 1 in each of the rows corresponding to nodes s and p. The column vector $b_1$ resulting from the column-wise concatenation of the right-hand-sides of (2) and (3) is integral. Therefore, from the Hoffman-Kruskal Theorem, the baseline method (P1) satisfies the integer solution property.

Energy Reservation Method (P2)

Now consider the linear optimization method with constraints (2), (3) and (4). The constraint matrix of (P2) is shown to be equivalent to a network matrix. The inequality constraints (2), (3) and (4) are first replaced by a system of equality constraints:

$$\sum_{p \in P} x_p^j + u^j = e^j, \text{ for all } j \in J \quad \text{(Eq. 9)}$$

$$\sum_{j \in J} x_p^j + v_p = 1, \text{ for all } p \in P \quad \text{(Eq. 10)}$$

$$\sum_{p \in \Delta q} x_p^j - y_p^j + w_q^j = \Delta e_q^j, \text{ for all } j \in J, p \in P, \quad \text{(Eq. 11)}$$

where $u^j$, $v_p$, and $w_q^j$ are non-negative slack variables. In order to view the resulting constraint matrix as a balanced network matrix, two additional dummy constraints are included without affecting the solution to the original optimization method:

$$\sum_{j \in J} u^j = \max\left\{0, T - \sum_{j \in J} e^j\right\}, \quad \text{(Eq. 12)}$$

$$\sum_{p \in P} v_p = \max\left\{0, \sum_{j \in J} e^j - T\right\}. \quad \text{(Eq. 13)}$$

Again, the example with 2 ping sources ($N_S$=2) and 5 ping times (T=5) is used for ease of presentation. In this example, the scenario window is subdivided into 2 subintervals ($N_\Delta$=2) with $\Delta_1$ consisting of ping times $\{1, 2, 3\}$ and $\Delta_2$ of ping times $\{4, 5\}$. The corresponding constraint matrix, $A_2$, for the new equivalent linear method is given by:

$$A_2 = \begin{bmatrix} A & 0 & I_2 & 0 & 0 \\ B & 0 & 0 & I_5 & 0 \\ C & -I_4 & 0 & 0 & I_4 \\ 0 & 0 & a & 0 & 0 \\ 0 & 0 & 0 & b & 0 \end{bmatrix},$$

where $$C = \begin{bmatrix} 1 & 0 & 1 & 0 & 1 & 0 & 0 & 0 & 0 & 0 \\ 0 & 0 & 0 & 0 & 0 & 0 & 1 & 0 & 1 & 0 \\ 0 & 1 & 0 & 1 & 0 & 1 & 0 & 0 & 0 & 0 \\ 0 & 0 & 0 & 0 & 0 & 0 & 0 & 1 & 0 & 1 \end{bmatrix}.$$

A and B are as previously defined, a and b are row vectors of 1s of size 2 and 5 respectively, the 0s in $A_2$ are zero matrices of appropriate dimensions, and $I_n$ corresponds to an identity matrix of size n. In general, C, a, and b have the dimensions of $(N_S \times N_\Delta) \times (N_S \times T)$, $1 \times N_S$, and $1 \times T$ respectively. It is apparent that the rows of A and C are linearly dependent. Using elementary row operations, $A_2$ can be rewritten in an alternative equivalent form, $A'_2$ as:

$$A'_2 = \begin{bmatrix} 0 & D & I_2 & 0 & -D \\ -B & 0 & 0 & -I_5 & 0 \\ C & -I_4 & 0 & 0 & I_4 \\ 0 & 0 & -a & 0 & 0 \\ 0 & 0 & 0 & b & 0 \end{bmatrix},$$

where $$D = \begin{bmatrix} 1 & 1 & 0 & 0 \\ 0 & 0 & 1 & 1 \end{bmatrix}.$$

Each column of $A'_2$ has exactly one 1 and exactly one −1, and the rest of the entries are zeros. It is recognized that $A'_2$ is a node-edge incidence matrix of a directed network (see FIG. 4) and represents the constraint matrix of the minimum cost flow problem, which is totally unimodular.

Figure 4:
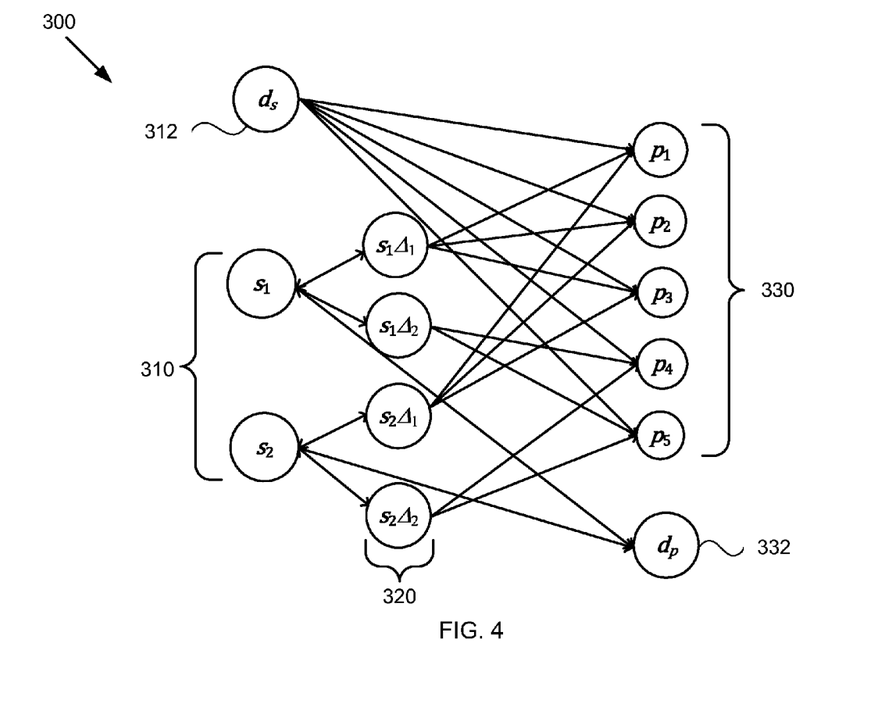
FIG. 4 shows a diagram illustrating a network representing the constraint matrix $A'_2$ for an example with three sources, six ping times, and four source-subinterval pairs in accordance with the Ping Control Optimization Method for Multi-Static Active Acoustic Networks.

The column vector $b_2$ resulting from the column-wise concatenation of the right-hand-sides of (9)-(13) is integral. The elementary row operations result in an integral column vector $b'_2$. Therefore, from the Hoffman-Kruskal Theorem, the energy reservation method (P2) satisfies the integer solution property. FIG. 4 shows a diagram 300 of a network representing the constraint matrix $A'_2$. In this example, there are two ping sources 310 and a dummy ping source 312, for a total of three ping sources $\{s_1, s_2, d_s, \}$, five ping times 330 and a dummy ping time 332 for a total of six ping times $\{p_1, p_2, p_3, p_4, p_5, d_p\}$, and four source-subinterval pairs $\{s_1\Delta_1, s_1\Delta_2, s_2\Delta_1, s_2\Delta_2\}$.

It has been shown that constraint matrices of (P1) and (P2) can be represented as networks, and therefore (P1) and (P2) can be solved very efficiently using a specialized network algorithm, such as the network simplex method.

Ping Activity Method (P3)

Now consider the linear optimization method with constraints (2), (3) and (5). Again, the example with 2 ping sources ($N_s=2$) and 5 ping times (T=5) is used and set n=3 ($N_\delta$=T−n+1=3). The constraint matrix, $A_3$, is given by $$A_3 = \begin{bmatrix} A & 0 \\ B & 0 \\ -E & -I_3 \end{bmatrix},$$

where $$E = \begin{bmatrix} 1 & 1 & 1 & 1 & 1 & 0 & 0 & 0 & 0 \\ 0 & 0 & 1 & 1 & 1 & 1 & 1 & 0 & 0 \\ 0 & 0 & 0 & 0 & 1 & 1 & 1 & 1 & 1 \end{bmatrix},$$

and A and B are as defined previously. In general, E has the dimensions of $N_\delta \times (N_s \times T)$. To show the TU property of the constraint matrix, the inequality constraints are first converted into equality constraints using slack variables. The resulting constraint matrix, $A'_3$, is then transformed into an alternative equivalent form using elementary row operations, which do not change the solution of the linear system. Adding slack variables, equality constraint matrix, $A'_3$, has the following form:

$$A'_3 = \begin{bmatrix} A & 0 & I_2 & 0 & 0 \\ B & 0 & 0 & I_5 & 0 \\ -E & -I_3 & 0 & 0 & I_3 \end{bmatrix}.$$

The pattern of E, which consists of rows of consecutive ones representing the running time intervals, is different from the network pattern shown in (P1) and (P2). Elementary row operations are then performed on $A'_3$. The rows of E and B are linearly dependent and the resulting transformed matrix $A''_3$ is given by:

$$A''_3 = \begin{bmatrix} A & 0 & I_2 & 0 & 0 \\ B & 0 & 0 & I_5 & 0 \\ 0 & -I_3 & 0 & F & I_3 \end{bmatrix},$$

where $$F = \begin{bmatrix} 1 & 1 & 1 & 0 & 0 \\ 0 & 1 & 1 & 1 & 0 \\ 0 & 0 & 1 & 1 & 1 \end{bmatrix}.$$

The consecutive-ones property of E is preserved in F, and therefore F is totally unimodular. Since $[A\ B]^T$ and F are totally unimodular, it can be shown that $A''_3$ is totally unimodular. First, it is shown that the following matrix $$G = \begin{bmatrix} A & 0 \\ B & I \\ 0 & F \end{bmatrix}$$

is totally unimodular. Since G is TU, it can be easily shown that the matrix resulting from concatenating G row-wise by $[0\ 0\ I]^T$, $[0\ 0\ -I]^T$ or $[I\ 0\ 0]^T$ is still TU. Therefore, it is concluded that $A''_3$ is totally unimodular.

The column vector $b''_3$ resulting from the column-wise concatenation of the right-hand-sides of equality constraints is integral. Therefore, from the Hoffman-Kruskal Theorem, the ping activity method (P3) satisfies the integer solution property.

Complete Method (P4)

Using similar reasoning as in (P3), it can be shown that (P4) satisfies the integer solution property.

Simulation Results

Figure 5:
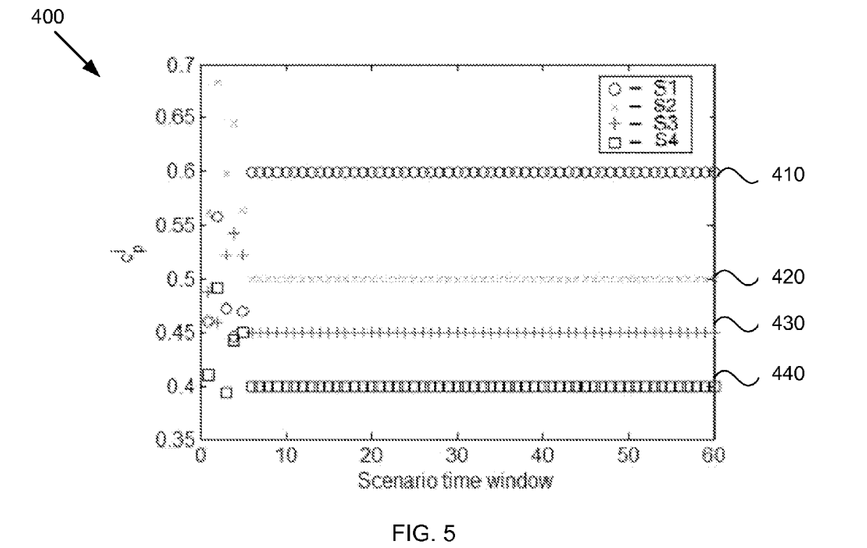
FIG. 5 shows a graph depicting simulated detection performance metric predictions for four sources over the scenario time window in accordance with the Ping Control Optimization Method for Multi-Static Active Acoustic Networks.

In this section, the properties of ping control solutions of optimization methods (P1) to (P4) are demonstrated. First, sonar performance metric predictions $c_p^j$ for source j∈J and ping time p∈P are needed. In the following examples, four sources ($N_s$=4) and a remaining scenario time window of length 60 (T=60) are specified. Random numbers between 0 and 1 are then generated to represent the detection performance metric predictions for the four sources for each of the first five ping times. Constant random numbers are specified for the remaining ping times between 6 and 60 to represent the detection performance metrics of four sources with uniform target distribution in the search area. FIG. 5 shows a graph 400 of simulated performance metric predictions for four sources 410, 420, 430, and 440, over the scenario time window.

Figure 7:
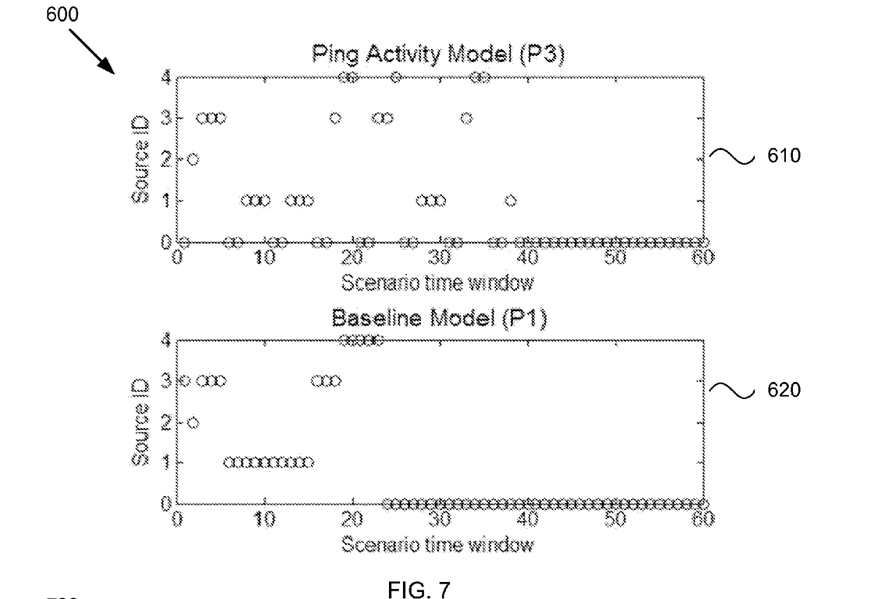
FIG. 7 shows a graph illustrating a ping decision comparison between the baseline method and the ping activity method, in accordance with the Ping Control Optimization Method for Multi-Static Active Acoustic Networks.
Figure 8:
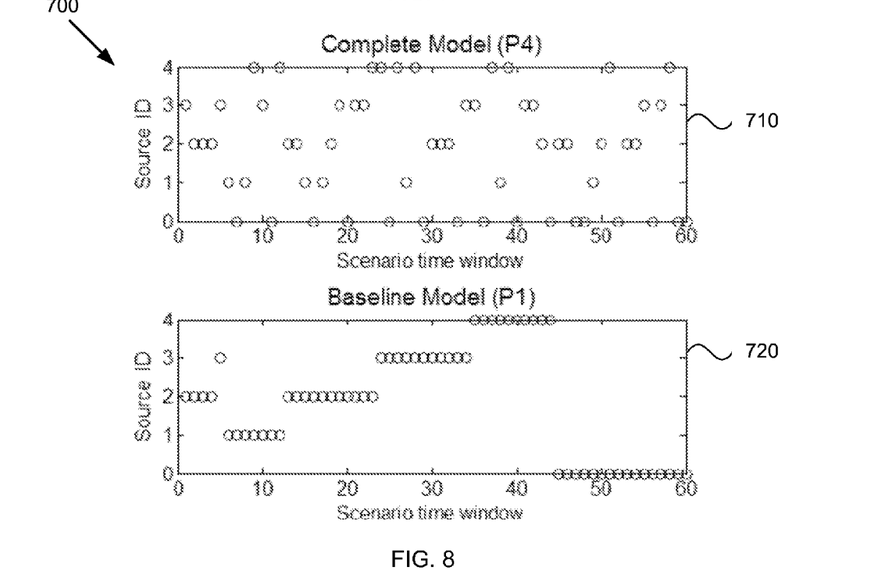
FIG. 8 shows a graph illustrating a ping decision comparison between the baseline method and the complete method, in accordance with the Ping Control Optimization Method for Multi-Static Active Acoustic Networks.

Depending on the specified remaining pings for each source and other user-input parameters (criteria for energy limited or very limited scenario, criteria for $\Delta_q$ and $\delta_r$, penalty costs, etc.), the algorithm then transforms the problem into one of the linear programming methods {(P1), ..., (P4)} and obtains the respective ping control solutions. Three examples are generated, examples (a), (b) and (c), corresponding to operational conditions for (P2), (P3), and (P4). (P1) is then solved for each of the operational conditions and its solution is used as a baseline comparison to the solution of other methods. The graphical comparisons are shown in FIGS. 6-8.

Example (a) represents an operational condition for (P2) with limited pings at some sources but enough total number of pings for the scenario window. The remaining pings at sources 1 to 4 ($e^j$, j=1, 2, 3, 4) are 20, 7, 23, 10 respectively. The scenario time window of 60 ping times (T=60) is divided into 5 subintervals ($N_A$=5) with each subinterval consisting of 12 ping times. The penalty metric for over utilization, $a_q^j$, is set to 0.3 for sources 1 and 3 and 0.8 for sources 2 and 4 for each subinterval $\Delta_q$; q=1, 2, ..., 5.

Figure 6:
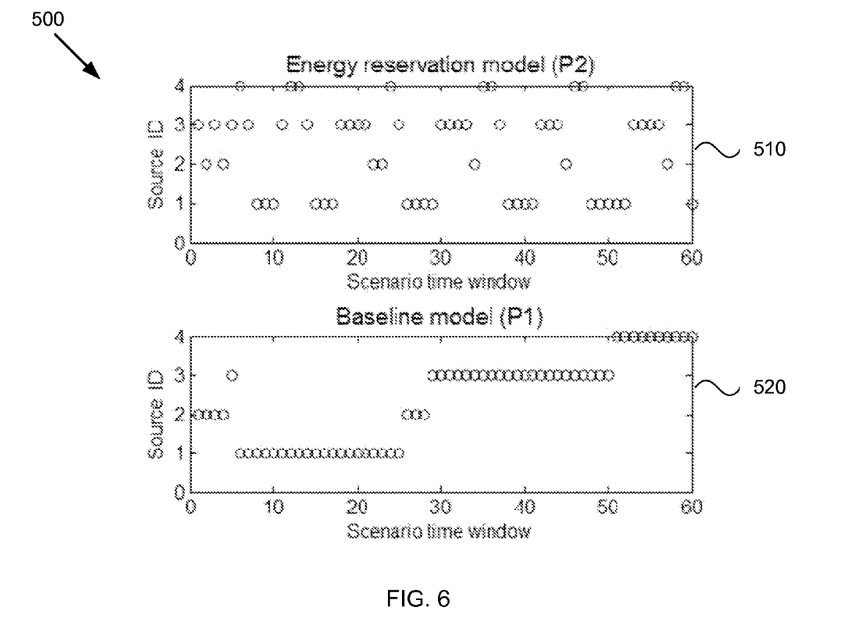
FIG. 6 shows a graph illustrating a ping decision comparison between the baseline method and the energy reservation method, in accordance with the Ping Control Optimization Method for Multi-Static Active Acoustic Networks.

The methods (P1) and (P2) are solved and the ping control results are shown in FIG. 6. FIG. 6 shows graphs 500 illustrating a ping decision comparison between the energy reservation method 510 and the baseline method 520. As shown, a circle in each graph indicates a ping, while a circle at source ID 0 (null ping) represents no ping. For the first 5 ping times, the sum of the detection performance metrics of the (P1) solution is greater than that of the (P2) solution by 0.15. For the whole scenario window of length 60, the difference in the sums of detection performance metrics is only 0.05. Considering detection performance metric alone, the (P1) ping control strategy exhausts ping energy of sources 1 and 2 before the middle of the planned scenario window. With the inclusion of energy reservation objective, the (P2) ping control strategy reserves some of the ping energy of sources 1 and 2 for usage near the end of the scenario window.

Example (b) represents an operational condition for (P3) with very limited total number of pings. The remaining pings at sources 1 to 4 are 10, 1, 7, and 5 respectively. The m-of-n ping activity rule is set to 3-of-5. The penalty metric for under pinging in each running interval, $b_r$, is set to $0.5\gamma^{r-1}$, where $\gamma$ is a discount factor of 0.9 and r∈R={1, 2, ..., 56}.

The methods (P1) and (P3) are then solved and the ping control results are shown in FIG. 7. FIG. 7 shows graphs 600 illustrating a ping decision comparison between the ping activity method 610 and the baseline method 620. A circle in each graph indicates a ping, while a circle at source ID 0 (null ping) represents no ping. The sum of the detection performance metrics of the (P1) solution is greater than that of the (P2) solution by only 0.04 over the network lifetimes. However, the network lifetime of the (P3) ping control strategy exceeds that of the (P1) strategy by 15 ping times.

Example (c) represents an operational condition for (P4) with the total number of pings available is less than the scenario time window of 60 but not as limited as in an operational condition for (P3). The remaining pings at sources 1 to 4 are 7, 15, 12, and 10 respectively. The parameters for energy reservation and ping activity objectives are the same as in examples (a) and (b). The methods (P1) and (P4) are then solved and the ping control results are shown in FIG. 8. FIG. 8 shows graphs 700 illustrating a ping decision comparison between the complete method 710 and the baseline method 720. A circle in each graph indicates a ping, while a circle at source ID 0 (null ping) represents no ping. The sum of the detection performance metrics of the (P1) solution is greater than that of the (P2) solution by only 0.02 over the network lifetimes. However, the network lifetime of the (P4) ping control strategy exceeds that of the (P1) by 14 ping times. In addition, the (P4) ping control strategy reserves some ping energy of all available sources for usage in all subintervals, while the (P1) strategy exhausts sources 1 and 2 energy before the middle of the planned scenario time window.

Figure 9:
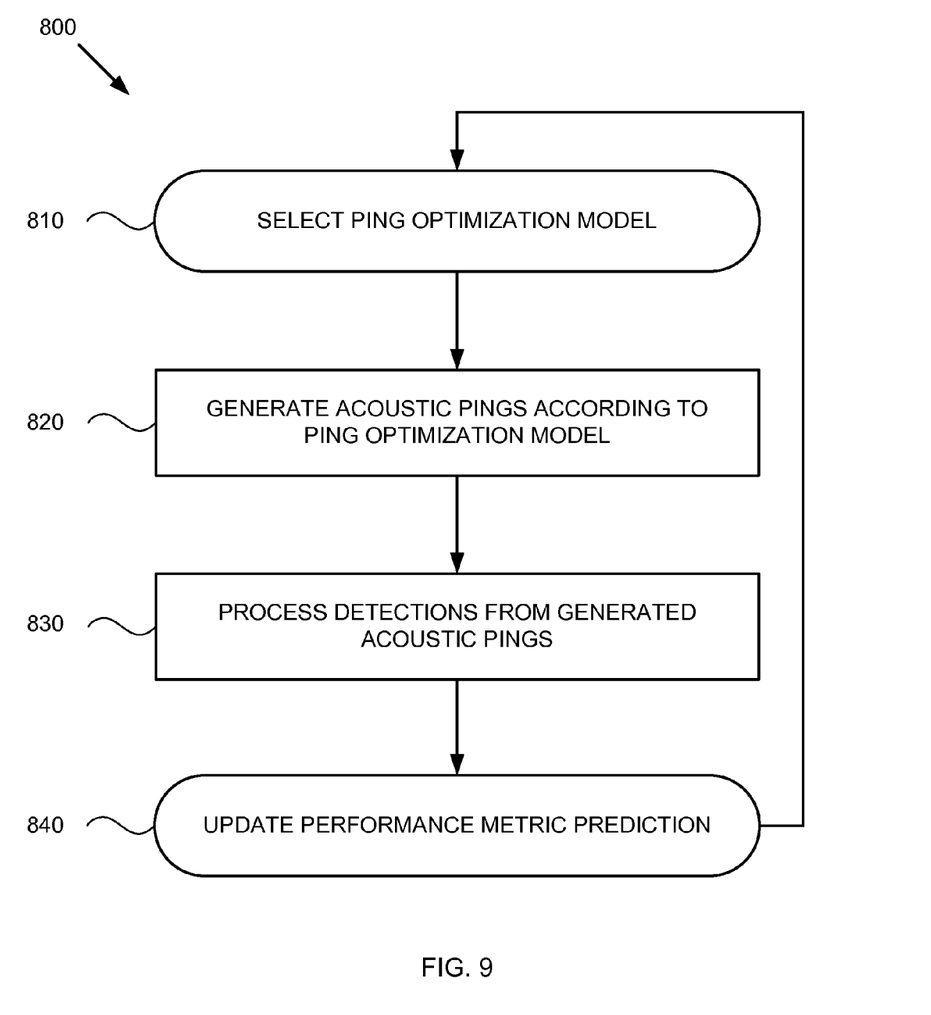
FIG. 9 shows a flowchart of an embodiment of a method in accordance with the Ping Control Optimization Method for Multi-Static Active Acoustic Networks.

FIG. 9 shows a flowchart of an embodiment of a method 800 in accordance with the Ping Control Optimization Method for Multi-Static Active Acoustic Networks. As an example, method 800 may be performed by system 10 as shown in FIG. 1 and will be discussed with reference to system architecture 10 and its respective components. Further, while FIG. 9 shows one embodiment of method 800 to include steps 810-840, other embodiments of method 800 may contain fewer or more steps. Further, while in some embodiments the steps of method 800 may be performed as shown in FIG. 9, in other embodiments the steps may be performed in a different order, or certain steps may occur simultaneously with one or more other steps. Method 800 may involve iteratively repeating steps 810-840 until the end of an operational scenario time window.

Step 810 involves selecting a ping optimization method based upon a mission mode (such as target search, track hold, and search and hold), remaining operational scenario time, total remaining ping energy, and a performance metric. As an example, if the operational scenario time is 4 hours, the remaining operational scenario time is the time left in the operational scenario, which could be any time less than 4 hours. The total remaining ping energy is the total combined ping energy remaining for all of ping sources 30. Further, as noted above, a performance metrics may include an average detection probability during search mode with confirmed detections, a probability of target presence during search mode without confirmed detections, a probability of target presence during search and/or track-hold mode with confirmed detections, and a residual risk metric for area clearance.

In step 810, if the operational scenario time window is short, the selected ping optimization method (i.e. baseline method (P1)) involves maximizing the performance metric over the operational scenario time window. If a ping energy for at least one of the acoustic ping sources is limited, the selected ping optimization method (i.e. energy reservation method (P2)) involves maximizing the performance metric over the operational scenario time window and preventing over usage of the acoustic ping source having limited ping energy. If the total remaining ping energy is limited with respect to the operational scenario time window, the selected ping optimization method (i.e. ping activity model (P3)) involves extending the lifetime of the ping source network while maintaining a minimum ping activity level for each of the acoustic ping sources. Upon the occurrence of the ping energy being limited at certain ping sources and there not being enough total remaining ping energy for the planned operational scenario time window, the selected ping optimization method (i.e. complete model (P4)) involves strategically distributing null pings over the operational scenario time window to last the duration of the operational scenario time window.

Step 820 involves generating a set of acoustic pings using an acoustic ping source network 20 comprising more than one acoustic ping sources 30 selected according to the ping optimization method, (P1)-(P4). Step 830 involves processing detections from the generated set of acoustic pings, such detections received by receivers 40. The detections may be processed by processor 50, using as an example, the programming code and various modules stored therein. The processing of the pings may involve standard signal processing of receiver data, forming measurement contacts, and estimating current and future target states.

Step 840 then involves updating a performance metric prediction for the operational scenario time window. The prediction for a selected performance metric may be updated using target state predictions from Tracker and SNR predictions from a Sonar Performance Model to compute the selected performance such as probability of detection, probability of target presence, residual risk metric, etc.

Method 800 may be implemented as a series of modules, either functioning alone or in concert, with physical electronic and computer hardware devices. Method 800 may be implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Ping Control Optimization Method for Multi-Static Active Acoustic Networks are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:
    until the end of a known operational scenario time window, iteratively repeating the steps of
        selecting a ping optimization method based upon a mission mode of operation, remaining scenario time in the operational scenario time window, total remaining ping energy, and an acoustic performance metric, wherein the mission mode of operation is one of target search, track-holding, and search and hold,
        generating a set of acoustic pings using an acoustic ping source network comprising more than one acoustic ping sources selected according to the ping optimization method,
        processing detections from the generated set of acoustic pings, and
        updating performance metric predictions associated with optimization decision variables for the operational scenario time window.

2. The method of claim 1, wherein if the operational scenario time window is short, the selected ping optimization method involves maximizing the acoustic performance metric over the operational scenario time window without regards to energy and ping activity constraints.

3. The method of claim 2, wherein an objective function for the selected ping optimization method is solved according to $\max \Sigma_{p \in P} \Sigma_{j \in J} c_p^j x_p^j$, subject to $\Sigma_{p \in P} x_p^j \leq e^j$, for all $j \in J$ and $\Sigma_{j \in J} x_p^j \leq 1$, for all $p \in P$, where $x_p^j$ is binary for all $j \in J$ and $p \in P$, where $c_p^j$ is a performance metric of acoustic ping source j at ping time p for $j \in J$ and $p \in P$, where $x_p^j$ is a binary ping decision variable for j at p for $j \in J$ and $p \in P$, where $J = \{1, 2, \ldots, N_S\}$, where $N_S$ is the number of acoustic ping sources, where $P = \{1, 2, \ldots, T\}$, and where T is the number of discretized ping times in the remaining scenario window.

4. The method of claim 1, wherein if a ping energy for at least one of the acoustic ping sources is limited, the selected ping optimization method involves maximizing the acoustic performance metric over the operational scenario time window while preventing over usage of the acoustic ping source having limited ping energy.

5. The method of claim 4, wherein an objective function for the selected ping optimization method is solved according to $\max \Sigma_{p \in P} \Sigma_{j \in J} c_p^j x_p^j - \Sigma_{q \in Q} \Sigma_{j \in J} a_q^j y_q^j$, subject to $\Sigma_{p \in P} x_p^j \leq e^j$, for all $j \in J$, $\Sigma_{j \in J} x_p^j \leq 1$, for all $p \in P$, and $\Sigma_{p \in \Delta q} x_p^j - y_q^j \leq \Delta e_q^j$, for all $j \in J$ and $q \in Q$, where $x_p^j$ is binary for all $j \in J$ and $p \in P$, where $a_q^j$ is a penalty coefficient for over utilization of source j in subinterval q for $j \in J$ and $q \in Q$, where $y_q^j$ is a non-negative integer for all $j \in J$ and $q \in Q$, where $c_p^j$ is a performance metric of acoustic ping source j at ping time p for $j \in J$ and $p \in P$, where $x_p^j$ is a binary ping decision variable for j at p for $j \in J$ and $p \in P$, where $J = \{1, 2, \ldots, N_S\}$, where $N_S$ is the number of acoustic ping sources, where $P = \{1, 2, \ldots, T\}$, where T is the number of discretized ping times in the remaining scenario window, where $Q = \{1, 2, \ldots, N_A\}$, and where $N_A$ is the number of subintervals in the remaining scenario window.

6. The method of claim 4 further comprising the step of applying a penalty to the performance metric prediction if there is over usage of ping energy by the acoustic ping sources having limited energy.

7. The method of claim 1, wherein if the total remaining ping energy is limited with respect to the operational scenario time window, the selected ping optimization method involves extending the lifetime of the ping source network while maintaining a minimum ping activity level for each of the acoustic ping sources.

8. The method of claim 7, wherein an objective function for the selected ping optimization method is solved according to $\max \Sigma_{p \in P} \Sigma_{j \in J} c_p^j x_p^j - \Sigma_{r \in R} b_r z_r$, subject to $\Sigma_{p \in P} x_p^j \leq e^j$, for all $j \in J$, $\Sigma_{j \in J} x_p^j \leq 1$ for all $p \in P$, and $\Sigma_{p \in \delta} \Sigma_{j \in J} x_p^j + z_r \geq m$ for all $r \in R$, where $x_p^j$ is binary for all $j \in J$ and $p \in P$, where $b_r$ is a penalty coefficient for under pinging in running time interval r, $r \in R$, where $z_r$ is an under pinging integer decision variable in running time interval r, $r \in R$, where $c_p^j$ is a performance metric of acoustic ping source j at ping time p for $j \in J$ and $p \in P$, where $x_p^j$ is a binary ping decision variable for j at p for $j \in J$ and $p \in P$, where $J = \{1, 2, \ldots, N_S\}$, where $N_S$ is the number of acoustic ping sources, where $P = \{1, 2, \ldots, T\}$, and where T is the number of discretized ping times in the remaining scenario window.

9. The method of claim 7 further comprising the step of generating at least m pings over n discretized ping times to prevent long gaps between successive pings.

10. The method of claim 1, wherein based upon the occurrence of the ping energy being limited at certain ping sources and there not being enough total remaining ping energy for the planned operational scenario time window, the selected ping optimization method involves strategically distributing null pings over the operational scenario time window to last the duration of the operational scenario time window.

11. The method of claim 10, wherein an objective function for the selected ping optimization method is solved according to max $\Sigma_{p \in P} \Sigma_{j \in J} c_p^j x_p^j - \Sigma_{q \in Q} \Sigma_{j \in J} a_q^j y_q^j - \Sigma_{r \in R} b_r z_r$, subject to $\Sigma_{p \in P} x_p^j \leq e^j$, for all $j \in J$, $\Sigma_{j \in J} x_p^j \leq 1$ for all $p \in P$, $\Sigma_{p \in \Delta q} x_p^j - y_q^j \leq \Delta e_q^j$, for all $j \in J$ and $q \in Q$, and $\Sigma_{p \in \delta} \Sigma_{j \in J} x_p^j + z_r \geq m$ for all $r \in R$, where $x_p^j$ is binary for all $j \in J$ and $p \in P$, where $y_q^j$ is a non-negative integer for all $j \in J$ and $q \in Q$, where $b_r$ is a penalty coefficient for under pinging in running time interval r, $r \in R$, where $z_r$ is an under pinging integer decision variable in running time interval r, $r \in R$, where $c_p^j$ is a performance metric of acoustic ping source j at ping time p for $j \in J$ and $p \in P$, where $x_p^j$ is a binary ping decision variable for j at p for $j \in J$ and $p \in P$, where $a_q^j$ is a penalty coefficient for over utilization of source j in subinterval q for $j \in J$ and $q \in Q$, where $J = \{1, 2, \ldots, N_S\}$, where $N_S$ is the number of acoustic ping sources, where $P = \{1, 2, \ldots, T\}$, where T is the number of discretized ping times in the remaining scenario window, where $Q = \{1, 2, \ldots, N_\Delta\}$, and where $N_\Delta$ is the number of subintervals in the remaining scenario window.

12. A non-transitory computer readable storage medium having a method, represented by computer readable programming code, encoded thereon, the method comprising the steps of:
    until the end of a known operational scenario time window, iteratively repeating the steps of
        selecting a ping optimization method based upon a mission mode of operation, remaining scenario time, in the operational scenario time window, total remaining ping energy, and an acoustic performance metric, wherein the mission mode of operation is one of target search, track-holding, and search and hold,
        generating a set of acoustic pings using an acoustic ping source network comprising more than one acoustic ping sources selected according to the ping optimization method,
        processing detections from the generated set of acoustic pings, and
        updating performance metric predictions associated with optimization decision variables for the operational scenario time window.

13. The non-transitory computer readable storage medium of claim 12, wherein if the operational scenario time window is short, the selected ping optimization method involves maximizing the acoustic performance metric over the operational scenario time window.

14. The non-transitory computer readable storage medium of claim 12, wherein if a ping energy for at least one of the acoustic ping sources is limited, the selected ping optimization method involves maximizing the acoustic performance metric over the operational scenario time window while preventing over usage of the acoustic ping source having limited ping energy.

15. The non-transitory computer readable storage medium of claim 14 further comprising the step of applying a penalty to the performance metric prediction if there is over usage of ping energy by the acoustic ping sources having limited energy.

16. The non-transitory computer readable storage medium of claim 12, wherein if the total remaining ping energy is limited with respect to the operational scenario time window, the selected ping optimization method involves extending the lifetime of the ping source network while maintaining a minimum ping activity level for each of the acoustic ping sources.

17. The non-transitory computer readable storage medium of claim 12, wherein based upon the occurrence of the ping energy being limited at certain ping sources and there not being enough total remaining ping energy for the planned operational scenario time window, the selected ping optimization method involves strategically distributing null pings over the operational scenario time window to last the duration of the operational scenario time window.

18. A system comprising:
    a network comprising more than one ping source and more than one receiver; and
    a processor operatively connected to the network, the processor having program instructions stored therein, wherein the program instructions are executable by the processor to perform a method comprising the step of,
        until the end of a known operational scenario time window, iteratively repeating the steps of
            selecting a ping optimization method based upon a mission mode of operation, remaining scenario time in the operational scenario time window, total remaining ping energy, and an acoustic performance metric, wherein the mission mode of operation is one of target search, track-holding, and search and hold,
            generating a set of acoustic pings using an acoustic ping source network comprising more than one acoustic ping sources selected according to the ping optimization method,
            processing detections from the generated set of acoustic pings, and
            updating performance metric predictions associated with optimization decision variables for the operational scenario time window.

19. The system of claim 18, wherein the processor further comprises:
    a ping control generator module, stored therein, configured to generate and transmit active ping commands to the more than one ping source;
    a multi-static target tracker module, stored therein, configured to generate and transmit current and future kinematic target state and covariance estimates to the ping control generator module; and
    a sonar performance module, stored therein, configured to calculate ping control metrics that are a function of signal-to-noise ratios for given target-source-receiver states.

20. The system of claim 19, wherein the multi-static target tracker module is a centralized Kalman-Filter based target tracker and the sonar performance model module is a bi-static sonar performance module based on an active sonar equation.

* * * * *